(12) United States Patent
Fong et al.

(10) Patent No.: US 11,210,384 B2
(45) Date of Patent: Dec. 28, 2021

(54) CHALLENGE AND RESPONSE IN CONTINUOUS MULTIFACTOR AUTHENTICATION ON A SAFE CASE

(71) Applicant: PPIP LLC, Tempe, AZ (US)

(72) Inventors: Michael Fong, Chandler, AZ (US); Neric Hsin-wu Fong, Tempe, AZ (US); Stephen Kuo-Tung Seay Chan, Annapolis, MD (US)

(73) Assignee: PPIP, LLC, Chandler, AZ (US)

( * ) Notice: Subject to any disclaimer, the term of this patent is extended or adjusted under 35 U.S.C. 154(b) by 157 days.

(21) Appl. No.: 16/747,064

(22) Filed: Jan. 20, 2020

(65) Prior Publication Data

US 2021/0224374 A1    Jul. 22, 2021

(51) Int. Cl.
  *G06F 21/43*    (2013.01)
  *G06F 21/35*    (2013.01)
  *H04L 9/08*     (2006.01)
  *G06N 3/06*     (2006.01)

(52) U.S. Cl.
  CPC .............. *G06F 21/43* (2013.01); *G06F 21/35* (2013.01); *G06N 3/06* (2013.01); *H04L 9/0869* (2013.01); *G06F 2221/2103* (2013.01)

(58) Field of Classification Search
  CPC .. G06F 21/43; G06F 21/35; G06F 2221/2103; G06N 3/06; H04L 9/0869; H04L 9/08
  See application file for complete search history.

(56) References Cited

U.S. PATENT DOCUMENTS

| | | | |
|---|---|---|---|
| 2010/0201517 A1* | 8/2010 | Pujol | B64D 45/0015 340/541 |
| 2018/0253569 A1* | 9/2018 | Swierk | G06F 21/86 |

* cited by examiner

*Primary Examiner* — Quazi Farooqui
(74) *Attorney, Agent, or Firm* — Fernando & Partners, LLP (57) ABSTRACT

Disclosed is an apparatus performing a method including: receiving, by a decision unit coupled to a plurality of sensors at least partially supported by a housing which holds a personal communication device, trait data of a user of the personal communication device and determining whether or not a first authentication score generated based on a first set of trait data and a first set of weights assigned to the first set of trait data is above a pre-determined threshold. In some embodiments, the method includes providing a challenge to the user based on a determination that the first authentication score is below the pre-determined threshold, and gating electronic access to the personal communication device based on whether or not a second authentication score generated based on a second set of trait data and the first set of weights is above the pre-determined threshold.

20 Claims, 7 Drawing Sheets

CHALLENGE AND RESPONSE IN CONTINUOUS MULTIFACTOR AUTHENTICATION ON A SAFE CASE

TECHNICAL FIELD

This relates generally to the field of authenticating communication devices, and more specifically to an apparatus and methods thereof for continuous multifactor authentication.

BACKGROUND

As attackers are increasingly breaking into user devices that use single-factor authentication, and sometimes even those with two factors, use of multifactor authentication (MFA) has become more important than ever. Since the user devices can be compromised after being authenticated, there is a need to constantly monitor that the user devices remain authenticated.

Generally, a trust score is assigned to the user device. Depending on the trust score, the user is authorized or denied access to the device. However, there is no secure and convenient way of authenticating the user when the trust score is below a certain threshold. Moreover, there is a need to securely and continuously authenticate the users to provide access to the user devices.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

In accordance with common practice some features illustrated in the drawings cannot be drawn to scale. Accordingly, the dimensions of some features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Described herein are an apparatus and methods thereof for a challenge and response in multifactor authentication on a safe case system. According to some embodiments, the challenge and response in multifactor authentication on a safe case system includes a housing arranged to hold a personal communication device, a plurality of sensors, and a decision unit. The personal communication device may be a smartphone, a wearable gadget, a tablet, a notebook, or any other suitable communication device. In some embodiments, the plurality of sensors is at least partially supported by the housing of the safe case. In some embodiments, the plurality of sensors is in communication with the safe case and configured to receive trait data from a user of the personal communication device. In some embodiments, the plurality of sensors receives trait data in response to a challenge from the decision unit to the personal communication device. In some embodiments, the plurality of sensors receives trait data for initial authentication of the personal communication device.

In some embodiments, the decision unit determines whether or not a first authentication score is above a pre-determined threshold. In some embodiments, the first authentication score is generated based on a first set of trait data and a first set of weights assigned to the first set of trait data. When the decision unit determines the first authentication score of the user of the personal communication device is below the pre-determined threshold, the decision unit provides a challenge to the user. In some embodiments, the personal communication device, upon receiving the challenge, sends a response to the decision unit. In some embodiments, the response includes a second set of trait data. In some embodiments, the decision unit further generates a second authentication score. In some embodiments, the second authentication score is generated based on the first set of weights and the second set of trait data. In some embodiments, the decision unit gates electronic access to the personal communication device, when the second authentication score is above the pre-determined threshold.

In some embodiments, the personal communication device is held by the housing of the safe case. In some embodiments, a backpack attaches to the housing of the safe case. In some embodiments, the personal communication device includes a memory, one or more processors, a local communication device, an input/output device, and one or more applications. In some embodiments, the personal communication device further includes at least one sensor. In some embodiments, the at least one sensor receives trait data from the surroundings or the user of the personal communication device. In some embodiments, the one or more processors are in communication with the memory and the at least one sensor.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described embodiments. The first device and the second device are both devices, but they are not the same device, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming but would nevertheless be a routine undertaking for those of ordinary skill in the art of image capture having the benefit of this disclosure.

In general, MFA technologies use multiple authentication factors, such as something the user knows, something the user has, something the user is, and a context. Factors that the user knows include usernames, passwords, passphrases, Personal Identification Numbers (PINs), and confidence images (an image the user pre-selects that confirms that the site is genuine). Authentication factors that the user has include tokens and one-time passwords (a system sends a code to the user that the user should type in, in addition to his password), and encryption keys. Authentication factors related to what the user is include biometrics and behavior-based authentication.

Some of these authentication methods have seen significant improvements in recent years. As such, advances in Public Key Infrastructure (PKI) encryption include virtual smart cards that use trusted platform modules (TPM). Virtual smart cards safeguard encryption keys while limiting their use to the device that has the TPM. As an example, access from a user device from inside a location that the user frequently visits would allow a more relaxed authentication, while access from a remote location, e.g., an internet cafe in another country, would trigger additional security measures to log on. The enterprise or server can further take into consideration times when the user has never connected before and devices or IP addresses they have never used before.

Since each of the above-mentioned methods has its own advantages and disadvantages, combinations of more than two methods have attracted much attention. Amongst these methods, using biometric data have their pros and cons. Using biometric data, the user doesn't have to memorize the passwords. However, a biometric method using only one set of biometric data can fail if it cannot properly read or accurately confirm a fingerprint whereas a password that the user correctly enters will succeed. Moreover, a damaged fingerprint, a hand that is in a cast, or objections to biometric measurement based on religious grounds can make biometric methods unavailable. Further, voice recognition biometrics and facial recognition are not fully developed to be relied on as a single source of authentication.

Every authentication process that depends on what the user remembers, or carries can increase access failures or add security risks. With context-based authentication, if an attacker has possession of the user's device, they could control this factor of authentication, aiding their attack. The same goes for sending tokens via voice calls, emails, or texts; if someone has already compromised the device or account, then they have also compromised this form of authentication. In any such cases, the user must authenticate by some other means.

At high level, MFA is an approach to computerized security procedures that requires the user to provide more than one form of verification to prove their identity in order to gain access to a device. However, another issue arises when the user who is initially authorized to access the device, is no longer in possession of that device. In other words, an otherwise authorized device, no longer satisfies a certain trust score. To tackle this issue, a Continuous MFA (CMFA) method is disclosed herein, to assure that authorized users access a device at all times.

In some embodiments, as the user changes from moving to not moving and/or from holding the device to not holding the device, the number of factors in the CMFA varies. For example, when the user is not moving, gaits may not be an accurate CMFA factor. Thus, the trust score that is above the threshold at one point may fall below the threshold at a different time. Disclosed herein is a method and an apparatus to securely use a CMFA method with a challenge and response technique.

Figure 1:
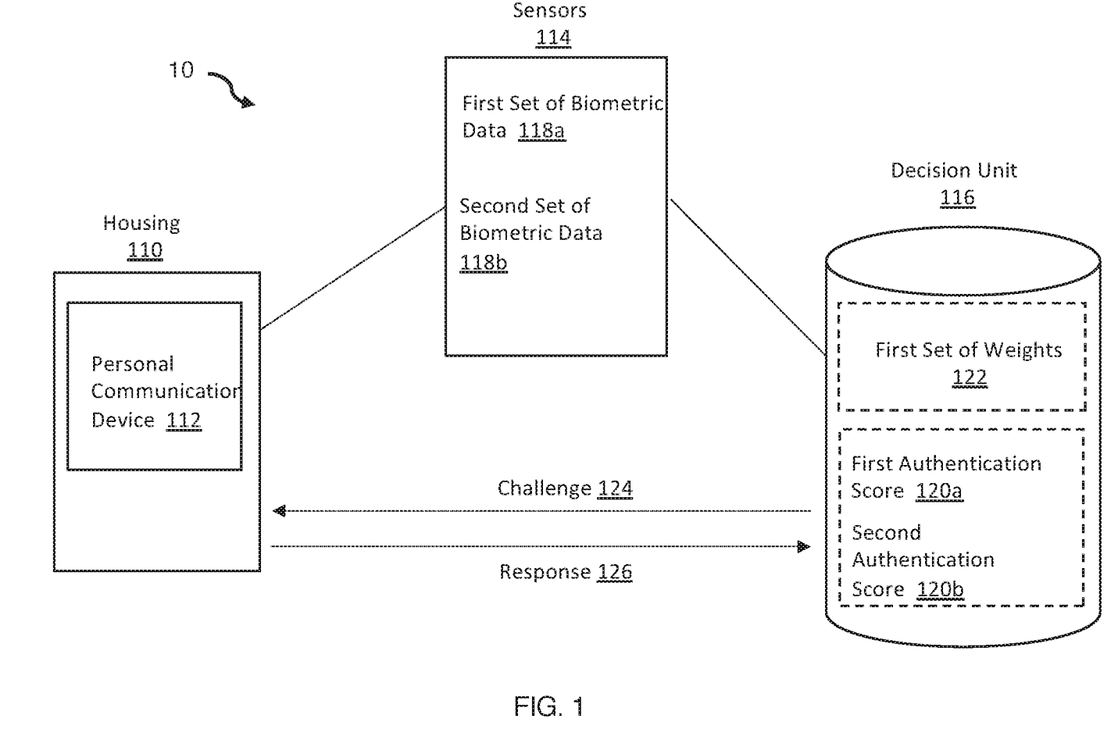
FIG. 1 is a simplified block diagram of a challenge and response in multifactor authentication on a safe case system, in accordance with some embodiments.

Referring to FIG. 1, a simplified block diagram of a challenge and response in multifactor authentication on a safe case system 10 is depicted, in accordance with some embodiments. In some embodiments, the challenge and response in multifactor authentication on the safe case system 10 includes a housing 110, a personal communication device 112, a plurality of sensors 114, and a decision unit 116. In some embodiments, the housing 110 is arranged to hold the personal communication device 112. The personal communication device 112 may be a smartphone, a wearable gadget, a tablet, a notebook, or any other suitable communication device. In some embodiments, the plurality of sensors 114 is at least partially supported by the housing 110. In some embodiments, the plurality of sensors 114 is in communication with a safe case that includes the housing 110. In some embodiments, the plurality of sensors 114 receives a set of trait data, e.g., a first set of trait data 118a, a second set of trait data 118b, from a user of the personal communication device 112. In some embodiments, the plurality of sensors 114 receives trait data in response to a challenge from the decision unit 116 to the personal communication device 112. In some embodiments, the plurality of sensors 116 receives trait data for initial authentication of the personal communication device 112.

In some embodiments, the decision unit 116 is coupled to the plurality of sensors 114. In some embodiments, the decision unit 116 determines whether or not a first authentication score 120a is above a pre-determined threshold. In some embodiments, the first authentication score 120a is generated based on the first set of trait data 118a and a first set of weights 122 assigned to the first set of trait data 118a. When the decision unit 116 determines the first authentication score 120a of the user of the personal communication device 112 is below the pre-determined threshold, the decision unit 116 provides a challenge 124 to the user. In some embodiments, the personal communication device 112, upon receiving the challenge 124, sends a response 126 to the decision unit 116. In some embodiments, the response 126 includes the second set of trait data 118b. In some embodiments, the decision unit 116 further generates a second authentication score 120b. In some embodiments, the second authentication score 120b is generated based on the first set of weights 122 and the second set of trait data 118b. In some embodiments, the decision unit 116 allows the personal communication device 112 electronic access, e.g., gating electronic signal to allow access to the personal communication device 112, when the second authentication score 120b is above the pre-determined threshold. In some embodiments, the decision unit 116 denies the personal communication device 112 electronic access, e.g., gating electronic signal to cease or deny access to the personal communication device 112, when the second authentication score 120b is below the pre-determined threshold.

As used herein, "trait data" include biometric data but are not limited to genetically determined characteristics. For example, locations, networks in the vicinity, etc., can reveal movement patterns and/or network usage patterns. The movement and/or network usage patterns in turn can reveal traits of a user, e.g., traveling along certain routes on daily basis. The trait data thus disclose at least one distinguishing quality or characteristic that belongs to a person.

A certain set of trait data can, temporarily or permanently, be unavailable for authentication. For example, a damaged fingerprint, a hand that is in a cast, or objections to certain biometric measurements based on religious grounds can render the set of trait data unavailable or unfit for authentication. In another example, voice recognition biometrics and facial recognition are still being developed, hence, cannot be fully relied on. Therefore, in some embodiments, the decision unit 116 abandons the first set of trait data 118a and sends the challenge 124 that requests the personal communication device 112 to provide the second set of trait data 118b. In some embodiments, the plurality of sensors 114 provides the second set of trait data 118b to the personal communication device 112. Assigning the first set of weights 122 to the second set of trait data 118b, the decision unit 116 calculates the second authentication score 120b. In some embodiments, a multi-trait-based trust score is assigned to each response 126. In some embodiments, at least one of a voice pattern, a gait, a device orientation, a pattern of life, one or more trusted network, and one or more trusted peripheral is used as a trait.

In some embodiments, more than one challenge 124 is sent to the personal communication device 112. In some embodiments, more than one response 126 is received from the personal communication device 112. In some embodiments, a trust score is determined for each response 126 received from the personal communication device 112. For example, when the user is moving and talking at a same time, a trust score is determined for the user's gaits and a separate trust score is determined for the user's voice. Subsequently, a weight is assigned to each of the trust scores based on pre-determined criteria. For example, a weight of 45% is assigned to the user's gaits, and a weight of 55% is assigned to the user's voice. Alternatively, when the user is sitting still and streaming video, a trust score is determined for user's facial image and a separate trust score is determined for user's iris scan. Subsequently, a weight is assigned to each of the trust scores based on the pre-determined criteria. For example, a weight of 65% is assigned to the user's facial image, and a weight of 35% is assigned to the user's iris scan.

In some embodiments, the decision unit 116 selects a challenge 124 based on a random selection of a challenge from among a plurality of pre-determined challenges. Alternatively, in some embodiments, the decision unit 116 selects the challenge 124 based on a context. Further, in some embodiments, the decision unit 116 selects one or more pre-configured challenges as the challenge 124. For example, a system administrator pre-configures one or more particular types of challenge as the challenge, e.g., collecting voice sample, seeking fingerprint, etc. Yet in some other embodiments, the challenge 124 is cloud-initiated. For example, as will be shown in FIG. 3 and described in further detail below, based on the received sensor data, a secure cloud platform 310 determines whether to provide a challenge to the user and directs the decision unit 116 to select the challenge 124. As such, the decision 116 is operable to provide the challenge 124 to the personal communication device 112 based on a cloud-initiated challenge.

In some embodiments, the decision unit 116 assigns the first set of weights 122 to the trait data based on a context. In some embodiments, contextual factors include a user's verifiable location, a time when the user authenticates to access the user device, and a device or an IP address the user is using. In some embodiments, a context adds the user's whereabouts, e.g., with the time and the IP address or device they are using, as a consideration when determining whether to make authentication easier or more difficult. In some embodiments, technologies such as smartphones, Bluetooth policy beacons, and GPS are used to determine context.

In some embodiments, the context is determined based on whether the user is moving. In some embodiments, the context is determined based on a proximity of the user to the personal communication device 112. In some embodiments, the context is determined based on a proximity of the user to the housing 110.

In some embodiments, the decision unit 116 assigns the first set of weights 122 to the trait data based on data received from the plurality of sensors 114. In some embodiments, trait data include fingerprints, facial recognition, voice, etc. In some embodiments, another type of trait data, i.e., behavioral trait data, is used. The behavioral trait data identify a user's behavior, such as how they type on a keyboard, how they use the internet, how they connect to the networks, or how they move from one location to another, among others.

In some embodiments, the sensor data is determined based on whether the user is moving, e.g., based on data received from accelerometer, gyroscope, compass, barometer, and/or motion sensor, etc. In some embodiments, the sensor data is determined based on a proximity of the user to the personal communication device 112. In some embodiments, the sensor data is determined based on a proximity of the user to the housing 110.

In some embodiments, the decision unit 116 performs a determination of whether or not the first authentication score is above the pre-determined threshold periodically. In some embodiments, the decision unit 116 performs a determination of whether or not the first authentication score is above the pre-determined threshold at certain time intervals. In some embodiments, the decision unit 116 performs a determination of whether or not the first authentication score is above the pre-determined threshold when one or more sensor data changes satisfy one or more pre-determined criteria. For example, when the motion sensor data changes fall less than a threshold, or rise above a threshold, it indicates that the device switches from moving to not moving or vice versa. As another example, when the location sensor data changes, it indicates that the device has traveled certain distance. Passing a threshold or changing the location sensor data can trigger the decision unit 116 to perform the determination of whether or not the first authentication score is above the pre-determined threshold.

In some embodiments, the decision unit 116 provides the challenge 124 to the personal communication device 112 based on a random challenge selected from a plurality of pre-defined challenges. In some embodiments, the decision unit 116 provides the challenge 124 to the personal communication device 112 based on a context. For example, if the user is moving, the decision unit 116 provides the challenge 124 to the personal communication device 112 for collecting the heart rhythm or gait. As another example, if the user is known to have a distinct voice and the ambient noise level is low, the decision unit 116 provides the challenge 124 to the personal communication device 112 for collecting a voice sample. In other words, in some embodiments, the decision unit 116 provides a pre-configured challenge. In some embodiments, the pre-configured challenge is re-configurable, e.g., an administrator configures one or more challenges for the user to respond to and/or re-configures the one or more challenges over time.

In some embodiments, the decision unit 116, in response to detecting an authorization score for a set of trait data below the pre-determined threshold, selects a different set of trait data. In such instances, the decision unit 116 provides a challenge 124 to the personal communication device 112, requesting a new set of trait data. Alternatively, in some embodiments, the decision unit 116, in response to detecting an authorization score for a set of trait data below the pre-determined threshold, assigns a different set of weights to the trait data.

In some embodiments, the decision unit 116, upon determining that the authentication score is above the pre-determined threshold, gates full electronic access to the personal communication device 112. Alternatively, in some embodiments, the decision unit 116, upon determining that the authentication score is above the pre-determined threshold, gates electronic access to pre-determined parts or components of the personal communication device 112. For example, the decision unit 116 disables wireless communication capability or certain sensors.

Figure 2A:
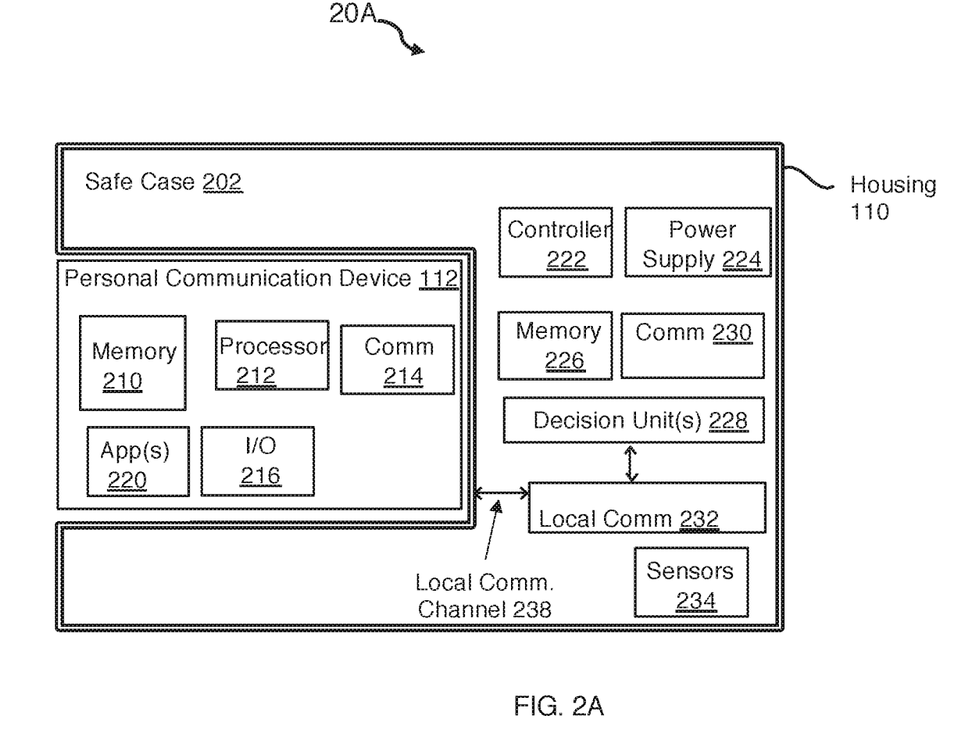
FIGS. 2A and 2B illustrate an apparatus for a challenge and response in multifactor authentication on a safe case system, in accordance with some embodiments.
Figure 2B:
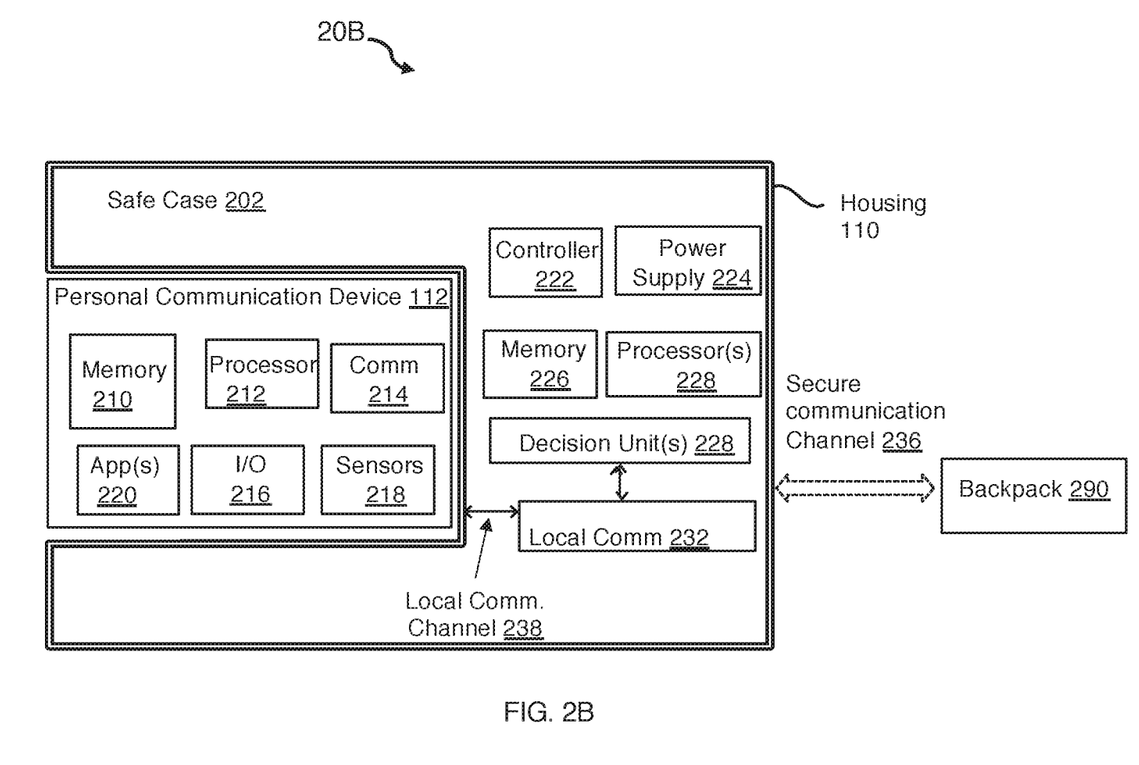

FIGS. 2A and 2B illustrate embodiments 20A and 20B of an apparatus. In some embodiments, a safe case 202, also referred to as an active case, with additional sensors 234 that are at least partially supported by the housing 110, as is shown in FIG. 2A. As explained above with reference to FIG. 1, the decision unit 116 receives the sensor data from the sensors 114. Further as explained above with reference to FIG. 1, in some embodiments, one or more gaits can be used as the first set of trait data 118*a*. In some embodiments, the sensors 114 (FIG. 1) includes the additional sensors 234 on the safe case 202, where the additional sensors 234 provide the second set of trait data 118*b*. In some embodiments, the sensors 114 (FIG. 1) includes one or more additional sensors 218 that are located on the personal communication device 112, as shown in FIG. 2B. In such embodiments, the one or more additional sensors 218 on the personal communication device 112 provide the second set of trait data 118*b*.

In some embodiments, the personal communication device 112 is held by the housing 110. In some embodiments, the personal communication device 112 includes a memory 210, one or more processors 212, a local communication device 214, an input/output device 216, and one or more applications 220. In some embodiments, the personal communication device 112 further includes at least one sensor 218, as is shown in FIG. 2B. In some embodiments, the at least one sensor 218 receives trait data from surroundings or the user of the personal communication device 112. In some embodiments, the one or more processors 212 are in communication with the memory 210 and the at least one sensor 218.

As a non-limiting example, when the user is moving, gaits can be used as the first set of trait data 118*a*. However, when the user is sitting and his face is in a close distance from a screen of the personal communication device 112, based on the orientation of the device, facial image is used as the second set of trait data 118*b*. In some embodiments, the facial image of the user is detected by one or more infrared sensors, e.g., the one or more additional sensors 218, on the personal communication device 112. In some embodiments, the facial image of the user is detected by one or more infrared sensors, e.g., the additional sensors 234, on the safe case 202. In some embodiments, other identity-based trait data can be used. In some embodiments, the other identity-based trait data in additional to facial recognition includes fingerprint, voice recognition, keystroke dynamics, and signature. In some embodiments, the other identity-based trait data in additional to facial recognition includes vital signs such as heart rhythm, pulse rhythm, blood pressure patterns, odor, pattern of life, driving patterns, moving patterns, locations, network usages, etc.

In some embodiments, the safe case 202 protects the personal communication device 112 mechanically and against tracking or spying. In some embodiments, the safe case 202 includes a controller 222, a power supply 224, a memory 226, one or more decision units 228, and a local communication device 230. In some embodiments, the one or more decision units 228 perform the functions of the decision unit 116 described above with reference to FIG. 1. In some embodiments, the controller 222 performs the functions of the decision unit 116 described above with reference to FIG. 1. In some embodiments, the controller 222 and the one or more decision units 228 perform the functions of the decision unit 116 described above with reference to FIG. 1. In yet some other embodiments, components outside the safe case 202, e.g., a processor on the personal communication device 112, on a backpack 290 (FIG. 2B), and/or on a cloud server, perform the functions of the decision unit 116 described above with reference to FIG. 1. The safe case 202 can have one or more moveable components, e.g., a hood, operable to slide to one or more positions, e.g., up or down, as well as non-moveable components. In such embodiments, the one or more moveable components, when in a first position, e.g., hood pushed down, are mateable, e.g., mechanically and/or electrically, with the non-moving components to form a housing assembly, e.g., the housing 110. The housing 110 forms an enclosure that at least partially supports and holds the personal communication device 112, e.g., a partial enclosure or a whole enclosure encapsulating the personal communication device 112. When in certain position(s), the housing 110, along with other components of the safe case 202, protects the personal communication device 112 against tracking or spying, e.g., by audio jamming, camera covering, and/or RF shielding, etc. When the one or more moveable components of the housing 110 are in certain other position(s), e.g., hood slid up, a user can take the personal communication device 112 out of the housing 110 and place the personal communication device 112 in a non-protected mode.

In some embodiments, the controller 222 is coupled to the local communication device 230. Embodiments of the controller 222 include hardware, software, firmware, or a combination thereof.

In some embodiments, the apparatus 20 includes a local communication device 232 which is at least partially supported by the housing 110. In some embodiments, the local communication device 232 is connectable to the personal communication device 112, the safe case 202, and the decision unit 116. In some embodiments, the local communication device 232 establishes a local communication channel 238 between the personal communication device 112 and the safe case 202. In some embodiments, through the local communication channel 238, the decision unit 228 obtains at least one of the first set of trait data 118a and a second set of trait data 118b from the personal communication device 112, e.g., obtaining the sensor data from the sensors 218 (FIG. 2B). In some embodiments, the controller 222 manages a segment of the local communication channel 238 between the safe case 202 and the personal communication device 112 through the management of the local communication device 232. In some embodiments, the controller 222 also manages a secure communication channel 236 between the safe case 202 and the backpack 290 (FIG. 2B).

A backpack (also referred to as a supplemental functional device), as described herein, is a device connectable to the personal communication device 112 through the safe case 202 and provides supplemental functional functions to the personal communication device 110. A peripheral interface connects the supplemental functional device 290 to the safe case 202 and the local communication device 232 further connects the peripheral interface to the personal communication device 112. As such, the peripheral interface is a modular interface for the backpack 290, which is a detachable device that allows supplemental hardware and software functionalities to be provided to the user of the safe case 202.

For example, the backpack 290 can include sensors to detect RF energy emission, sniff uplink TCP/IP transfer, or detect the presence of chemicals or drugs, etc. The additional information collected by the sensors on the backpack 290 can be used by the safe case 202 as the first set of trait data 118a (FIG. 1) and/or the second set of trait data 118b (FIG. 1).

In addition to managing the communication channel 238, the controller 222 logs data in a secure area of the safe case 202. Logging data in the secure area of the safe case 202 has the advantage of providing trustworthy status reports of the personal communication device 112 for analysis in case the personal communication device 112 has been or potentially has been compromised. For example, many high-value enterprises invest significantly to implement tight monitoring and access control within their own networks but lose visibility and control to external networks such as the cellular networks or WiFi hotspots. Once a smartphone is compromised, the status report from the phone operating system may not be trustworthy. By logging data in a secure area of the apparatus, reliable status reports can be generated for Enterprise Mobility Management (EMM), and EMM can then rely on the reliable information to limit the threat spread.

In some embodiments, the safe case 202 includes a power supply 224. The power supply 224 supplies power to the local communication device 232, and/or the controller 222. In some embodiments, the power supply 224 includes at least one of a battery, a charging socket, a USB connector, a power plug, and/or a power socket. In some embodiments, the power supply 224 includes a connector for a battery. In some embodiments, the power supply 224 includes a plurality of power supplying components, e.g., one battery providing power to the local communication device 232 and/or the controller 222, etc. The plurality of power supply components can be connected to be charged together, charged separately, aggregating power to supply to one or more hardware electronic components of the safe case 202, or separately providing power to one or more hardware electronic components of the safe case 202.

In some embodiments, the local communication device 232 receives the information and passes to a validation engine. In some embodiments, the validation engine is stored in the memory 226 to be executed by controller 222 and validates one of more components of the personal communication device 112 based on the information received from the local communication device 232.

In some embodiments, the safe case 202 is a secure hardware, with hardware root of trust. For example, the safe case 202 includes a unique digital key created for the safe case 202. In some embodiments, the unique digital key is stored on the safe case 202. In some embodiments, the safe case 202 includes a secure boot loader. In some embodiments, the safe case 202, through code signing, authenticates processes in order to prevent hardware side channel attack. The authentication through code signing enables the data collected by sensors 234 on the safe case 202 to be independent from the sensors 218 (FIG. 2B) on the personal communication device 112. Therefore, in case the personal communication device 112 is compromised, the trait data collected by sensors 234 on the safe case 202 can be used for authentication.

Figure 3:
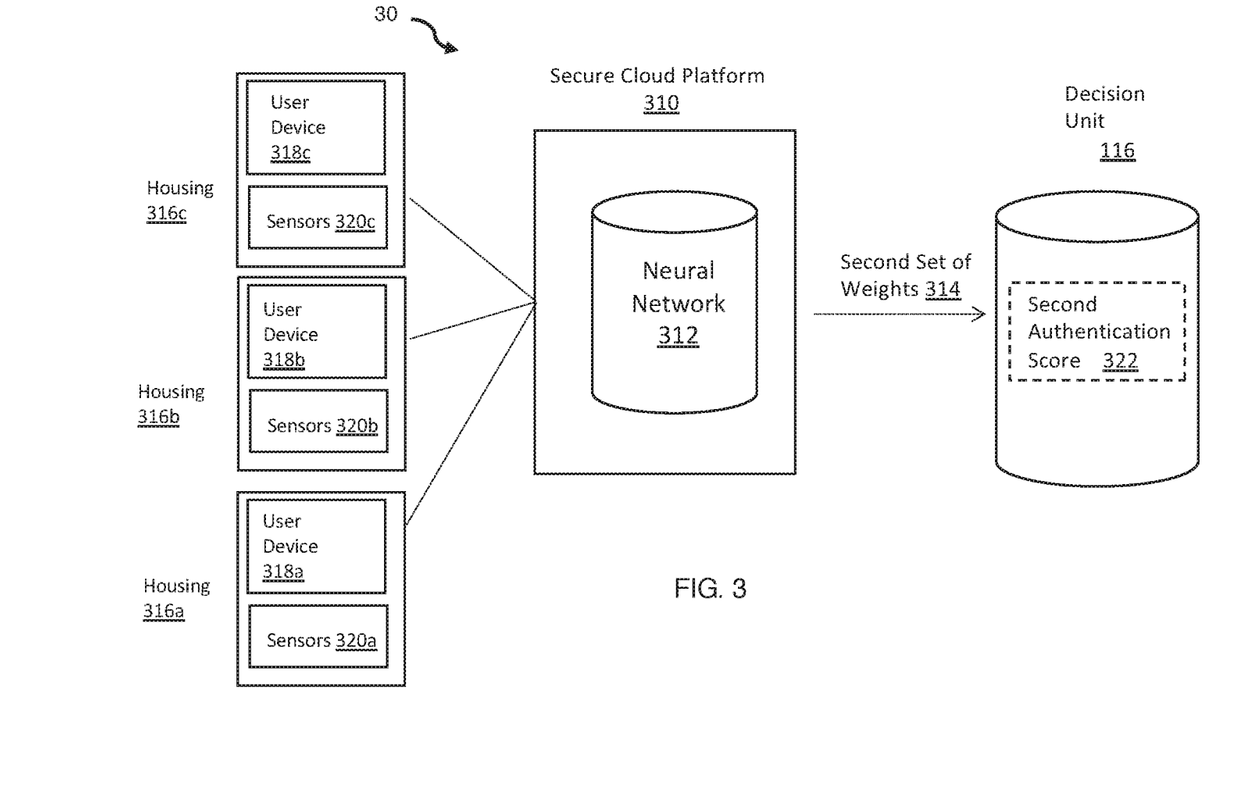
FIG. 3 is a simplified block diagram of a challenge and response in multifactor authentication on a safe case system, in accordance with some embodiments.

FIG. 3 illustrates a simplified block diagram of a challenge and response in multifactor authentication on a safe case system 30, in accordance with some embodiments. In some embodiments, the decision unit 116 receives a second set of weights 314 from a secure cloud platform 310. In some embodiments, the secure cloud platform 310 includes a neural network 312 for determining the second set of weights 314 based on aggregated data from a plurality of apparatuses (e.g., the safe case 202 in FIGS. 2A and 2B), each apparatus including a housing, e.g., housing 316a, housing 316b, housing 316c, arranged to hold a personal communication device, e.g., user device 318a, user device 318b, user device 318c. In some embodiments, each apparatus includes a plurality of sensors, e.g., sensors 320a, sensors 320b, sensors 320c. In some embodiments, the decision unit 116 receives the second set of weights 314 from the secure cloud platform 310 and determines the second authentication score 322 based on the second set of weights 314.

In some embodiments, the decision unit 116 is configured to assign the second set of weights 314 based on a context. In some embodiments, contextual factors include a user's verifiable location, the time when the user authenticates, and the device or an IP address the user is using. In some embodiments, context adds the user's whereabouts, e.g., with the time and the IP address or device they are using, as a consideration when determining whether to make authentication easier or more difficult. In some embodiments, technologies such as smartphones, Bluetooth policy beacons, and GPS are used to determine context.

In some embodiments, the context is determined based on whether the user is moving. In some embodiments, the context is determined based on a proximity of the user to the personal communication device. In some embodiments, the context is determined based on a proximity of the user to the housing.

In some embodiments, the decision unit 116 assigns the second set of weights 314 based on data received from the plurality of sensors, trait data. In some embodiments, trait data include fingerprints, facial recognition, voice, etc. In some embodiments, another type of trait data, i.e., behavioral trait data, is used. The behavioral trait data identify a user's behavior, such as how they type on a keyboard.

In some embodiments, the sensor data is determined based on whether the user is moving. In some embodiments, the sensor data is determined based on a proximity of the user to the personal communication device. In some embodiments, the sensor data is determined based on a proximity of the user to the housing.

Figure 4:
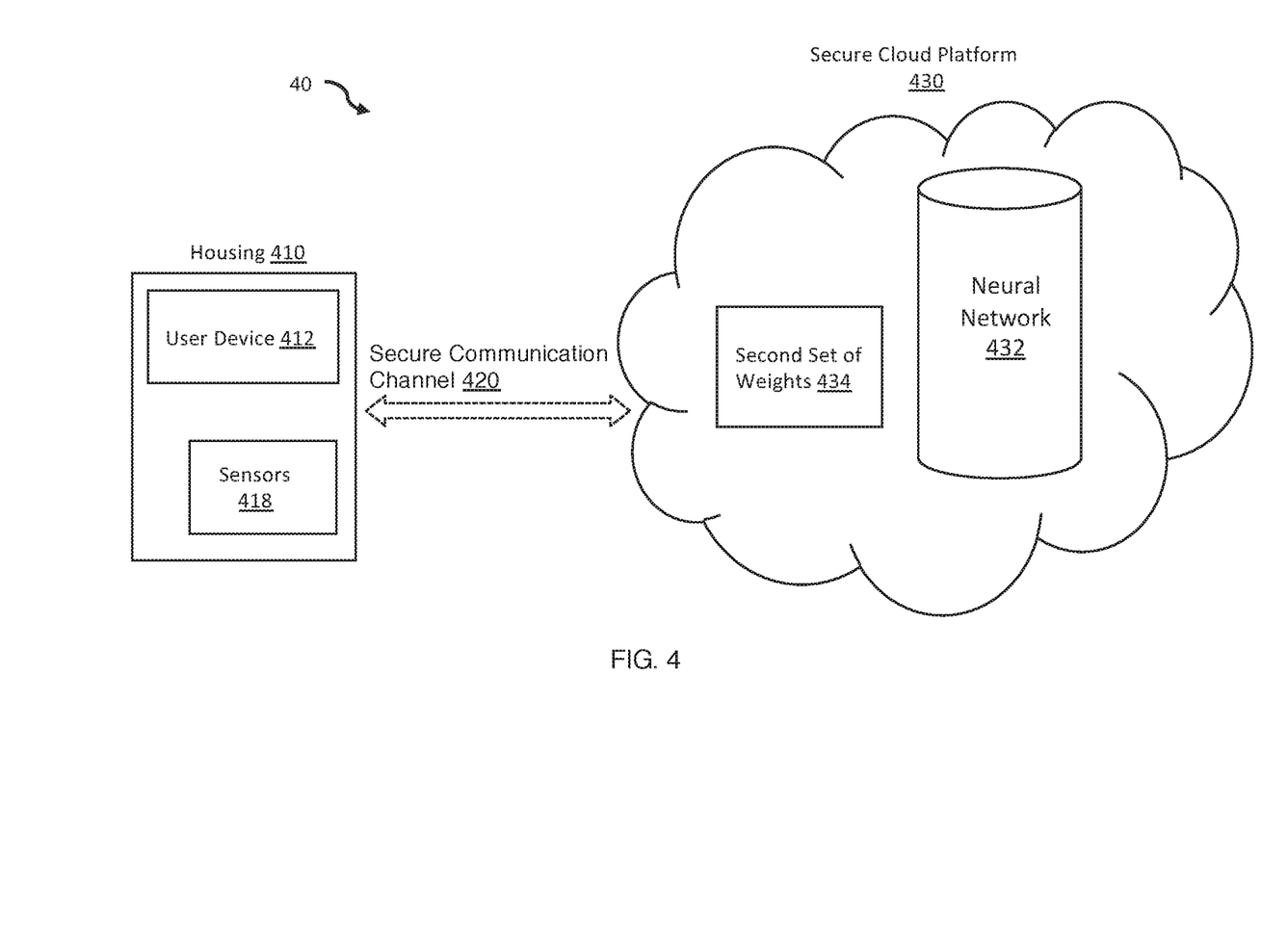
FIG. 4 is a simplified block diagram of a challenge and response in multifactor authentication on a safe case system, in accordance with some embodiments.

FIG. 4 illustrates a simplified block diagram of a challenge and response in multifactor authentication on a safe case system 40, according to some embodiments. In some embodiments, an apparatus (e.g., the safe case 202 in FIGS. 2A and 2B) includes a housing 410 that is arranged to hold a personal communication device (e.g., a user device 412) and one or more sensors 418. In some embodiments, the user device 412 is in communication with the secure cloud platform 430, through a secure communication channel 420. Therefore, any communication between the user device 412 and the secure could platform 430 is secure. In some embodiments, the secure cloud platform 430 includes a neural network 432. In some embodiments, the secure cloud platform 430 determines the second set of weights 434, using trait data provided by the one or more sensors 418 and through the secure communication channel 420.

Figure 5A:
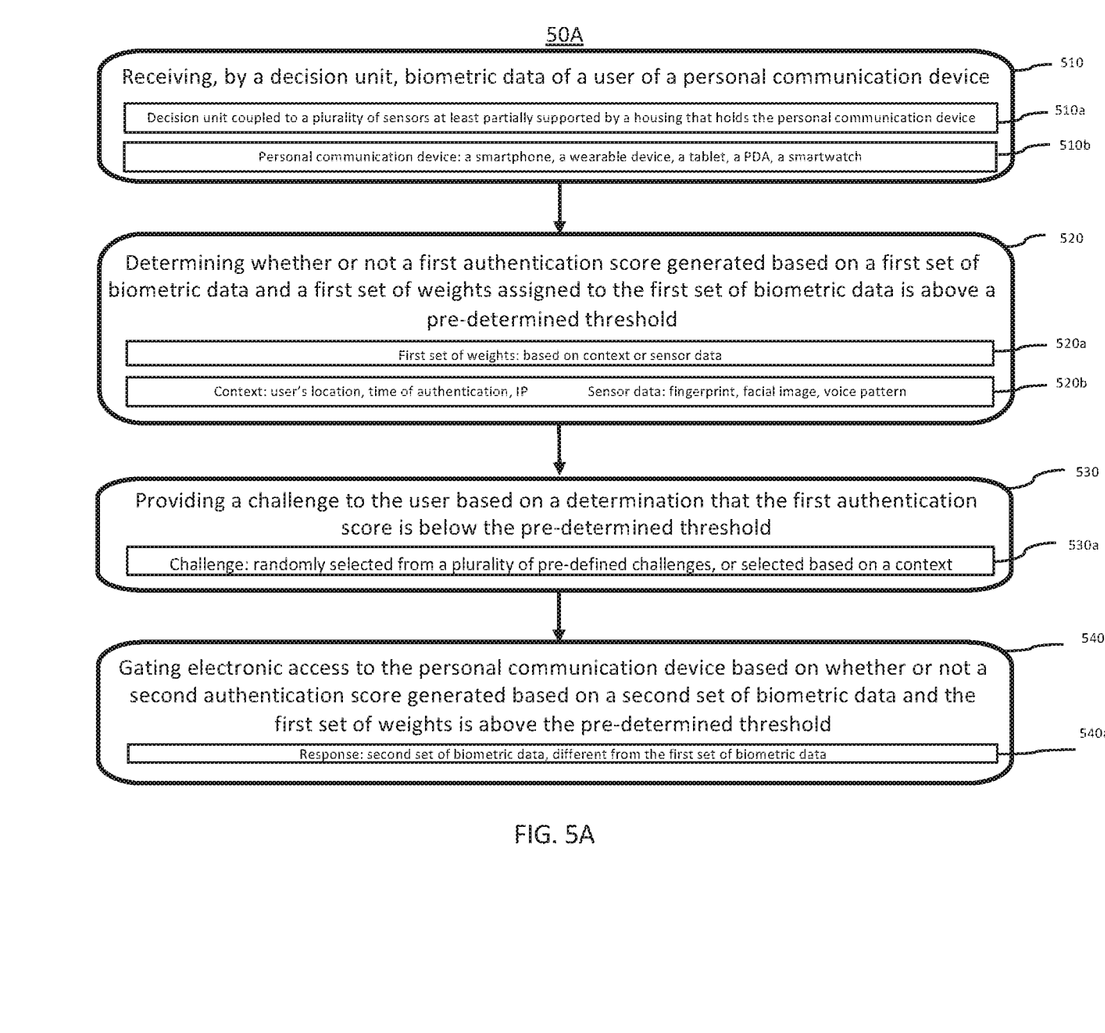
FIGS. 5A and 5B are a flowchart illustrating a method of challenge and response in multifactor authentication on a safe case, in accordance with some embodiments.

FIG. 5A illustrates a flowchart of a method 50A for a multifactor authentication on a safe case using a challenge and response, according to some embodiments. As represented by block 510, the method 50A includes receiving, by a decision unit (e.g., the decision unit 116 in FIGS. 1 and 3, or the decision unit 228 in FIGS. 2A and 2B), trait data of a user of a personal communication device. In some embodiments, the decision unit is coupled to a plurality of sensors. In some embodiments, the plurality of sensors is partially supported by a housing which is arranged to hold the personal communication device, as represented by block 510a. In some embodiments, the personal communication device is a smartphone, a wearable device, a tablet, a Personal Digital Assistance (PDA), a smartwatch, etc. as represented by block 510b. In some embodiments, the plurality of sensors is in communication with the safe case. In some embodiments, the plurality of sensors receives trait data, e.g., a first set of trait data, a second set of trait data, from the user of the personal communication device. In some embodiments, the plurality of sensors receives trait data for initial authentication of the personal communication device.

In some embodiments, the method 50A includes determining whether or not a first authentication score generated based on a first set of trait data and a first set of weights assigned to the first set of trait data is above a pre-determined threshold, as represented by block 520. In some embodiments, the decision unit assigns the first set of weights to the set of trait data based on at least one of: a context, and a sensor data, as represented by block 520a. In some embodiments, contextual factors include a user's verifiable location, a time when the user authenticates, and the device or an IP address the user is using, as represented by block 520b. In some embodiments, context adds the user's whereabouts, e.g., with the time and the IP address or device they are using, as a consideration when determining whether to make authentication easier or more difficult. In some embodiments, technologies such as smartphones, Bluetooth policy beacons, and GPS are used to determine context.

In some embodiments, sensor data include fingerprints, facial recognition, voice, etc. In some embodiments, another type of sensor data, i.e., behavioral trait data, is used. The behavioral trait data identify a user's behavior, such as how they type on a keyboard. In some embodiments, at least one of the context, and the sensor data is determined based on at least one of whether the user is moving, a proximity of the user and the personal communication device, and a proximity of the user and the housing.

In some embodiments, the method 50A includes providing a challenge to the user based on a determination that the first authentication score is below the pre-determined threshold, as represented by block 530. As represented by block 530a, in some embodiments, the decision unit selects a challenge based on a random selection of a challenge from among a plurality of pre-determined challenges. In some embodiments, the decision unit selects a challenge based on a context. In some embodiments, the decision unit provides a pre-determined challenge, e.g., a challenge configured and/or re-configured by an administrator. In some embodiments, the trigger for generating and providing a challenge is contextual instead of or in addition to the determination of the first authentication score relative to the pre-determined threshold. For example, the context can be established based the typical usage pattern of a banking application on the safe case, including the average wire transfer amount established as a safe wire transfer threshold. As such, a large wire transfer amount exceeding the safe wire transfer threshold can be the trigger for generating and providing the challenge.

In some embodiments, the method 50A includes gating electronic access to the personal communication device based on whether or not a second authentication score generated based on a second set of trait data and the first set of weights is above the pre-determined threshold, as represented by block 540. In some embodiments, the second set of trait data is obtained from the user and in response to the challenge. In some embodiments, the response includes a second set of trait data. As represented by block 540a, in some embodiments, the second set of trait data is different from the first set of trait data.

In some embodiments, more than one challenge is sent to the personal communication device, therefore, more than one response is received from the personal communication device. In some embodiments, a trust score is determined for each response received from the personal communication device. For example, when the user is moving and talking at a same time, a trust score is determined for user's gaits and a separate trust score is determined for user's voice. Subsequently, a weight is assigned to each of the trust scores based on pre-determined criteria. For example, a weight of 45% is assigned to the user's gaits, and a weight of 55% is assigned to the user's voice. Alternatively, when the user is sitting still and streaming video, a trust score is determined for user's facial image and a separate trust score is determined for user's iris scan. Subsequently, a weight is assigned to each of the trust scores based on the pre-determined criteria. For example, a weight of 65% is assigned to the user's facial image, and a weight of 35% is assigned to the user's iris scan.

In some embodiments, the determination step is performed periodically. In some embodiments, the determination step is performed at certain time intervals. In some embodiments, the determination step is performed when one or more sensor data changes satisfy one or more pre-determined criteria. For example, when the motion sensor data changes fall less than a threshold, or rise above a threshold, it indicates that the device switches from moving to not moving or vice versa. Passing a threshold can trigger the determination step.

In some embodiments, upon determination step, full electronic access to the personal communication device is granted. Alternatively, in some embodiments, upon determination step, electronic access to pre-determined parts of the personal communication device is granted. For example, the decision unit disables wireless communication capability or certain sensors.

Figure 5B:
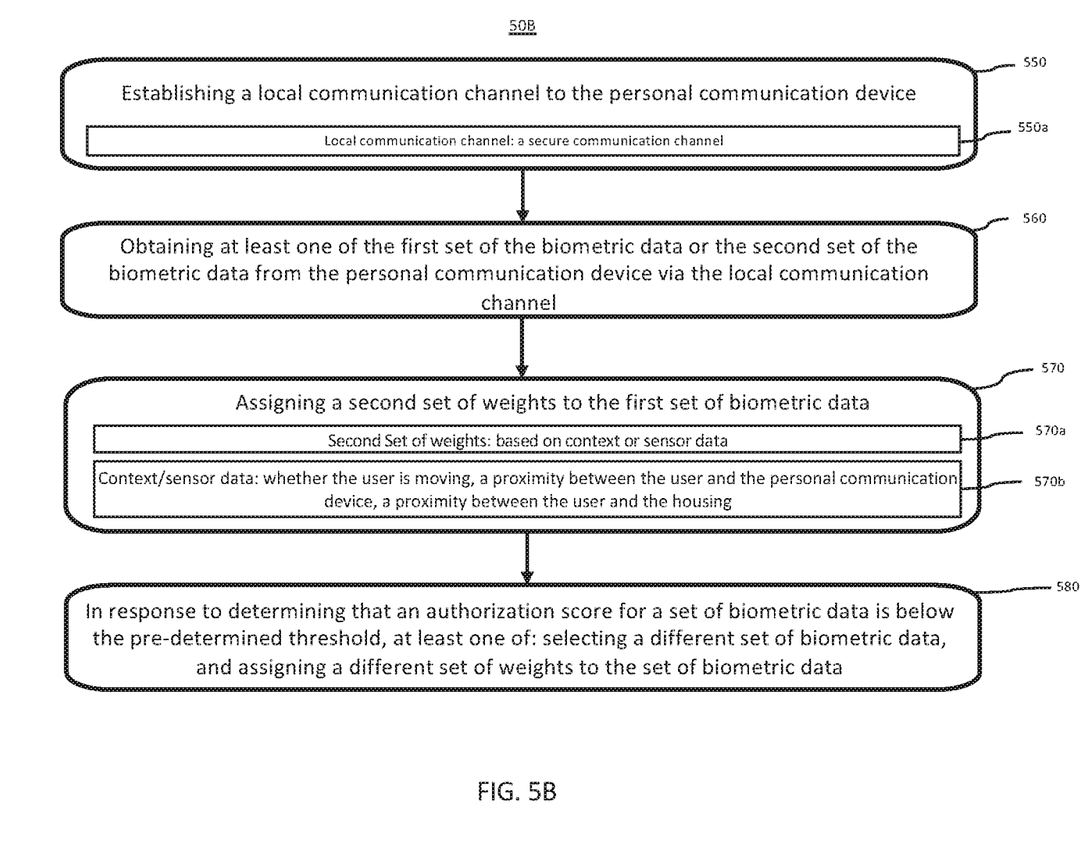

FIG. 5B illustrates a flowchart of a method 50B for a multifactor authentication on a safe case using a challenge and response, according to some embodiments. In some embodiments, the method 50B includes, establishing a local communication channel to the personal communication device, as represented by block 550. In some embodiments, the local communication channel is a secure communication channel, as represented by block 550a.

In some embodiments, the method 50B includes obtaining at least one of the first set of the trait data or the second set of the trait data from the personal communication device via the local communication channel, as represented by block 560. In some embodiments, the method 50B further includes assigning a second set of weights to the first set of trait data, as represented by block 570. In some embodiments, the second set of weights is assigned to the set of trait data based on at least one of the context, and a sensor data, as represented by block 570a. In some embodiments, at least one of the context, and the sensor data is determined based on at least one of whether the user is moving, a proximity of the user to the personal communication device, and a proximity of the user to the housing, as represented by block 570b.

As represented by block 580, in some embodiments the method 50B includes, in response to determining that an authorization score for a set of trait data is below the pre-determined threshold, at least one of selecting a different set of trait data, and assigning a different set of weights to the set of trait data.

In some embodiments, a first user of the personal communication device has a pre-determined threshold different from a second user of the personal communication device. In some embodiments, the second set of weights are obtained from a secure cloud platform. In some embodiments, the secure cloud platform has a neural network for determining the second set of weights based on aggregated data from a plurality of apparatuses, each apparatus including a housing arranged to hold a personal communication device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
   a housing arranged to hold a personal communication device;
   a plurality of sensors, at least partially supported by the housing, operable to receive trait data of a user of the personal communication device; and
   a decision unit, coupled to the plurality of sensors, operable to:
      determine whether or not a first authentication score generated based on a first set of trait data and a first set of weights assigned to the first set of trait data is above a pre-determined threshold;
      provide a challenge to the user based on a determination that the first authentication score is below the pre-determined threshold; and
      gate electronic access to the user of the personal communication device based on whether or not a second authentication score generated based on a second set of trait data and a second set of weights is above the pre-determined threshold, wherein the second set of trait data is obtained from the user and in response to the challenge.

2. The apparatus of claim 1, further comprising a local communication device at least partially supported by the housing and connectable to the personal communication device to establish a local communication channel, wherein the decision unit is further operable to obtain at least one of the first set of trait data or the second set of trait data from the personal communication device via the local communication channel.

3. The apparatus of claim 1, wherein the decision unit is further operable to assign at least one of the first set of weights to the first set of trait data or the second set of weights to the second set of trait data based on at least one of context or sensor data.

4. The apparatus of claim 3, wherein the at least one of the context or the sensor data includes at least one of whether the user is moving, a proximity between the user and the personal communication device, or a proximity between the user and the housing.

5. The apparatus of claim 1, wherein the decision unit is further operable to provide the challenge to the personal communication device based on at least one of a random challenge selected from a plurality of pre-defined challenges, a challenge selected based on context, a cloud-initiated challenge, or a pre-configured challenge.

6. The apparatus of claim 1, wherein the decision unit is further operable to determine whether or not the first authentication score is above the pre-determined threshold when one or more sensor data changes satisfy one or more pre-determined criteria.

7. The apparatus of claim 1, wherein the decision unit is further operable to:
in response to detecting the first authorization score for the first set of trait data below the pre-determined threshold, perform at least one of selecting a different set of trait data, or assigning a different set of weights to the different set of trait data.

8. The apparatus of claim 1, wherein the decision unit is further operable to gate full electronic access or partial electronic access to the personal communication device to pre-determined parts of the personal communication device.

9. The apparatus of claim 1, wherein the decision unit is operable to receive the second set of weights from a secure cloud platform, and the secure cloud platform has a neural network for determining the second set of weights based on aggregated data from a plurality of apparatuses, each of the plurality of apparatuses including a respective housing arranged to hold a respective personal communication device.

10. A method comprising:
at an apparatus including a housing arranged to hold a personal communication device, a plurality of sensors at least partially supported by the housing, and a decision unit:
receiving trait data of a user of the personal communication device;
determining whether or not a first authentication score generated based on a first set of trait data and a first set of weights assigned to the first set of trait data is above a pre-determined threshold;
providing a challenge to the user based on a determination that the first authentication score is below the pre-determined threshold; and
gating electronic access to the personal communication device based on whether or not a second authentication score generated based on a second set of trait data and a second set of weights is above the pre-determined threshold, wherein the second set of trait data is obtained from the user and in response to the challenge.

11. The method of claim 10, further comprising:
establishing a local communication channel to the personal communication device; and
obtaining at least one of the first set of trait data or the second set of trait data from the personal communication device via the local communication channel.

12. The method of claim 11, wherein the first set of trait data is different from the second set of trait data, and the first set of weights is different from the second set of weights.

13. The method of claim 10, wherein the first set of trait data is the same as the second set of trait data, the first set of weights is different from the second set of weights, and the second set of weights are assigned based on at least one of context, or sensor data.

14. The method of claim 13, wherein the at least one of the context or the sensor data includes at least one of whether the user is moving, a proximity between the user and the personal communication device, or a proximity between the user and the housing.

15. The method of claim 10, further comprising based on context, providing the challenge to the user.

16. The method of claim 10, wherein the challenge is selected based on at least one of a random challenge selected from a plurality of pre-defined challenges, or a challenge selected based on context.

17. The method of claim 10, wherein the determining step is performed when one or more sensor data changes satisfy one or more pre-determined criteria.

18. The method of claim 10, further comprising:
in response to detecting the first authorization score for the first set of trait data below the pre-determined threshold, performing at least one of selecting a different set of trait data, or assigning a different set of weights to the different set of trait data.

19. The method of claim 10, wherein gating the electronic access includes at least one of allowing full access to the personal communication device, or allowing access to pre-determined parts of the personal communication device.

20. The method of claim 10, wherein the decision unit is operable to receive the second set of weights from a secure cloud platform, and the secure cloud platform has a neural network for determining the second set of weights based on aggregated data from a plurality of apparatuses, each of the plurality of apparatuses including a respective housing arranged to hold a respective personal communication device.

* * * * *